United States Patent [19]
Hu et al.

[11] Patent Number: 6,095,306
[45] Date of Patent: Aug. 1, 2000

[54] PUSHROD IMPACT ISOLATOR

[75] Inventors: Jiamu Hu, Rochester Hills; Lisa Marie Van Wynsberghe, Clarkston; Bryan M. Stevens, Clinton Township; David Charles Peterson, Brandon; Keith V. Leigh-Monstevens, Rochester Hills, all of Mich.

[73] Assignee: Automotive Products (USA), Inc., Auburn Hills, Mich.

[21] Appl. No.: 09/345,205

[22] Filed: Jun. 30, 1999

[51] Int. Cl.[7] .................................................... F16D 11/00
[52] U.S. Cl. .................................. 192/109 F; 192/85 C; 192/99 S
[58] Field of Search .............................. 192/85 C, 109 F, 192/99 S, 30 V; 74/609, 579 R, 512, 514

[56] References Cited

U.S. PATENT DOCUMENTS

| | | | |
|---|---|---|---|
| 4,266,439 | 5/1981 | Hayashi et al. | 74/501 R |
| 4,281,753 | 8/1981 | Takemoto et al. | 192/99 S |
| 4,366,891 | 1/1983 | Maruyama | 192/99 S |
| 4,998,609 | 3/1991 | Nix | 192/109 F |
| 5,070,983 | 12/1991 | Leigh-Monstevens et al. | 192/85 C |
| 5,320,203 | 6/1994 | Wilbert et al. | 192/109 F |

OTHER PUBLICATIONS

Drawing No. 46954–ST0–0030, entitled "Damper Assy Push Rod", dated May 7, 1992, and two photographs showing a pushrod damper currently in use on the Honda Accord.

*Primary Examiner*—Rodney H. Bonck
*Assistant Examiner*—Tisha D. Waddell
*Attorney, Agent, or Firm*—Young & Basile, P.C.

[57] ABSTRACT

A pushrod assembly for use in association with a vehicle clutch control system of the type including a slave cylinder having an output member adapted for control of the clutch mechanism of the vehicle, a master cylinder for supplying hydraulic fluid to the slave cylinder, and a clutch control pedal assembly for actuating the master cylinder via the pushrod assembly. The pushrod assembly is connected at a forward end thereof to the master cylinder piston and is adapted for connection at a rearward end thereof to the clutch pedal arm and includes an isolator member of resilient material carried by the pushrod and interposed between the rearward pushrod end and the clutch pedal in a position to be resiliently distorted in response to movement of the control pedal in a release direction relative to the pushrod. When the operator's foot inadvertently slips off of the clutch pedal and the pushrod assembly flies back forcefully toward a pedal release position, the isolator member isolates the pedal arm assembly from the pushrod to reduce the impact on the pushrod and avoid system failures resulting from the impact loading.

14 Claims, 5 Drawing Sheets

PUSHROD IMPACT ISOLATOR

This invention relates to pushrod structures and more particularly to an impact absorbing pushrod structure for use with a vehicle control system.

Manual shift motor vehicles typically employ a clutch pedal for engagement and disengagement of the vehicle clutch to facilitate shifting. In one popular form of clutch control system the system includes a slave cylinder having an output member adapted to actuate the clutch, a master cylinder including a piston operative to deliver pressurized fluid to the slave cylinder, and a pushrod assembly connected to the master cylinder piston and adapted to be connected to the clutch pedal arm so that movement of the clutch pedal arm in an apply and a release direction effects disengagement and engagement of the clutch. Normally the movement of the clutch pedal in the apply and release direction is under the control of the vehicle operator so that no heavy shock loading or impact loading is introduced into the system during the course of the engaging or disengaging operation. However, on occasion, and especially in inclement weather, the operator's foot slips off of the depressed clutch pedal with the result that the master cylinder piston, pushrod assembly, and clutch pedal assembly are thrown violently back toward the clutch engaged position by the combined action of the return spring in the master cylinder, the diaphragm spring in the clutch, and the pedal assist spring in the clutch pedal assembly. As a result, in extreme situations, as the returning master cylinder piston bottoms out in the master cylinder the end of the pushrod connected to the master cylinder piston tears out of the spring clip connecting the end of the pushrod to the master cylinder piston and/or the master cylinder piston tears through the clip at the end of the master cylinder defining the bottomed out position of the piston. If the pushrod simply tears loose from the clip in the piston, the failure mode involves separation of the pushrod from the piston and disabling of the system. If the piston tears through the master cylinder clip the failure mode involves discharge of the piston from the master cylinder and discharge of the hydraulic fluid from the master cylinder, again with disabling of the system. The failure of the piston clip and/or the master cylinder clip occurs as a result of extremely high impact forces generated in the pushrod as the clutch pedal returns under the force of the clutch diaphragm springs, the master cylinder return spring, and the pedal assist spring, and the master cylinder piston arrives at its bottomed out position in the master cylinder while the momentum or inertia of the clutch pedal assembly attempts to continue the return movement of the clutch pedal.

SUMMARY OF THE INVENTION

This invention is directed to the provision of an improved pushrod structure.

More specifically, this invention is directed to the provision of a pushrod structure that precludes damage to and/or failure of the pushrod structure as a result of impact loading imparted to the pushrod structure by a rapidly returning clutch pedal assembly.

The invention is applicable to a vehicle control system of the type including a slave cylinder having an output member adapted for control of a mechanism of the vehicle; a master cylinder, including a piston, operative to deliver pressurized fluid to the slave cylinder; and a pushrod assembly connected to the master cylinder piston, adapted to be connected to a control pedal arm of the vehicle, and moveable in an apply and a release direction to effect control of the vehicle mechanism through the slave cylinder output member.

According to the invention, the pushrod assembly includes a pushrod connected at a forward end thereof to the master cylinder piston and adapted for connection at a rearward end thereof to the control pedal arm, and an isolator member of resilient material carried by the pushrod and interposed between the rearward pushrod end and the control pedal in a position to be resiliently distorted in response to movement of the control pedal in a release direction relative to the pushrod. With this arrangement, as the returning piston of the master cylinder bottoms out in the master cylinder and the pedal arm assembly attempts to continue its inertial return movement, the impact loading thereby introduced into the pushrod assembly is effectively reduced to a point where pushrod failure is essentially eliminated.

According to a further feature of the invention, the pushrod includes and eye portion proximate the rearward end thereof defining an eye opening adapted to receive a pivot pin carried by the control pedal arm, and the isolator member is positioned in the eye opening. This specific arrangement provides a simple and effective means of providing resilient distortion of the isolator member in response to continued inertial movement of the control pedal in a release direction following bottoming of the master cylinder piston.

According to further feature of the invention, the pushrod eye opening has an oblong configuration defining front and rear eye opening opposite ends; the isolator member is positioned in the rear eye opening end; and the pushrod assembly further includes a bushing of nonresilient material positioned in the front eye opening end, adapted to receive the pivot pin of the pedal arm, and abutting the isolator member. With this arrangement, the impact loading generated in the pushrod in a flyback situation is effectively diminished while retaining a positive nonresilient driving connection between the clutch pedal and the pushrod during application of the clutch pedal to disengage the clutch.

According to a further feature of the invention, the isolator member defines a concave surface abutting a matingly convex surface on the bushing; the front and rear eye opening opposite ends are defined by confronting concave surfaces; a convex surface on the bushing is seated against the concave surface at the front eye opening end; and the isolator member further includes a convex surface seated against the concave surface at the rear eye opening end. This specific arrangement provides an inexpensive and effective means of packaging the system to provide the desired impact isolation upon return, flyback movement of the clutch assembly while providing a positive drive relationship between the pedal arm and the pushrod during application of the clutch.

In the disclosed embodiment of the invention, the isolator member includes a main body portion positioned slidably in the eye opening and defining the concave and convex surfaces of the isolator member; the isolator member further includes laterally spaced outboard flange portions positioned against opposite side faces of the eye portion of the pushrod to guide the isolator in the eye opening and preclude lateral displacement of the isolator member relative to the eye portion; and the bushing includes a main body cylindrical portion positioned slidably in the eye opening and defining the convex bushing surfaces and laterally spaced outboard flange portions positioned against opposite side faces of the eye portion of the pushrod to guide the bushing in the eye opening and preclude lateral displacement of the bushing relative to the eye portion. This specific isolator member and bushing construction of the preferred embodiment provides a precise positive and effective action of the system during both apply and release movements of the clutch pedal.

DETAILED DESCRIPTION OF THE PREFERRED EMBODIMENT

Figure 1:
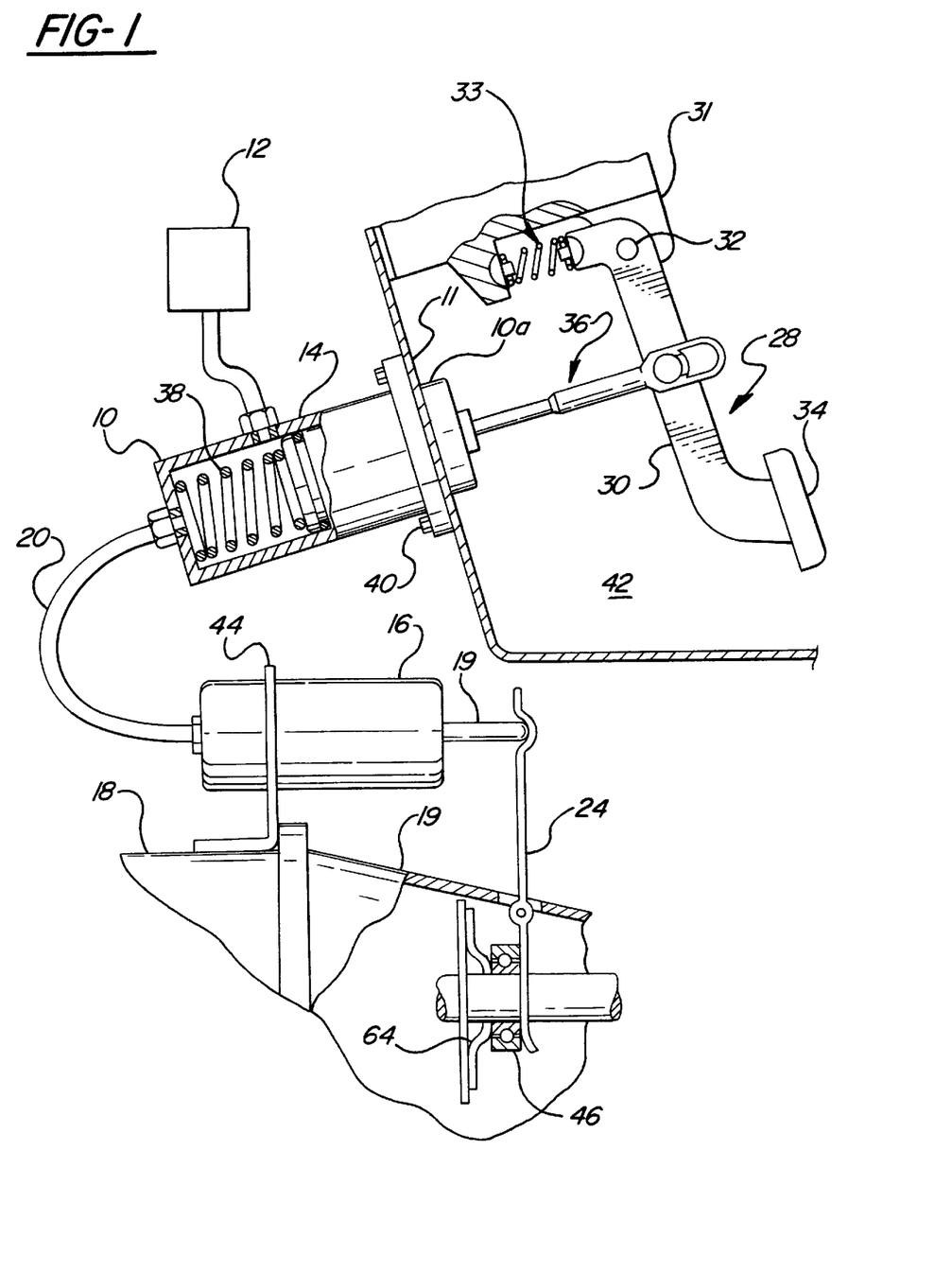
FIG. 1 is a somewhat schematic view of a clutch control system for a motor vehicle.

The vehicle clutch control system seen in FIG. 1 includes a master cylinder 10 secured to the fire wall 11 of the associated vehicle and including a remote reservoir 12 and a piston 14; a slave cylinder 16 secured to engine housing 18 or clutch housing 19 and including and output member or rod 19 driven by the piston of the slave cylinder; a conduit 20 interconnecting the input of the slave cylinder and the output of the master cylinder; a clutch release lever 24 associated with clutch housing 19; a clutch pedal assembly 28 including a pedal arm 30 pivoted to suitable bracketry 31 at 32, a pedal assist spring 33 interposed between bracketry 31 and the upper end of pedal arm 30, and a pedal pad 34 secured to the lower end of pedal arm 30; and a pedal rod assembly 36 interconnecting the piston 14 of the master cylinder and the pedal arm 30. It will be understood that pedal assist spring 33, in known manner, has an over center behavior and specifically is arranged to resist the initial pedal depressing movement and assist the final pedal depressing movement and, conversely, to resist the initial pedal return movement and assist the final pedal return movement.

Master cylinder 10 includes a return spring 38 and is secured to the engine side of firewall 11 utilizing suitable fasteners 40 with a nose or forward end portion 10a of the master cylinder projecting through the firewall and into the passenger compartment 42 of the vehicle.

Slave cylinder 16 is suitably secured to the engine and/or clutch housing utilizing suitable bracketry 44. The free end of output member 19 engages clutch release lever 24 which in turn engages the clutch release bearing 46 of the associated clutch mechanism whereby, in known manner, to disengage and engage the clutch in response to movement of the clutch pedal assembly in an apply and a release direction.

Pushrod assembly 36 (FIGS. 2–6) includes a pushrod 48, a bushing 50, and an isolator member 52.

Figure 2:
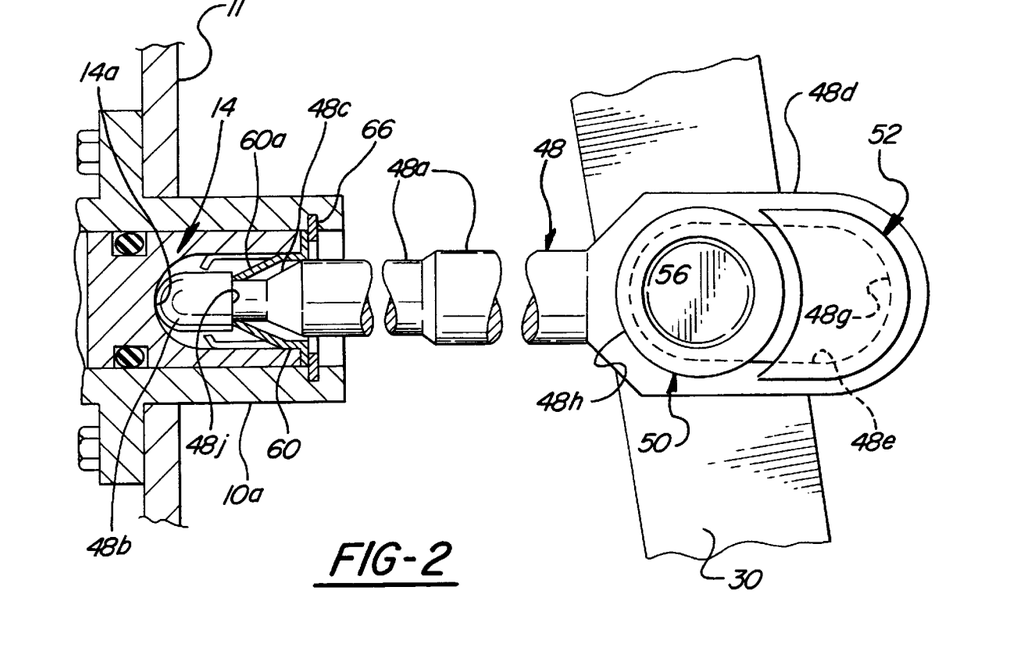
FIG. 2 is a view of a pushrod assembly utilized in the clutch control system of FIG. 1.
Figure 3:
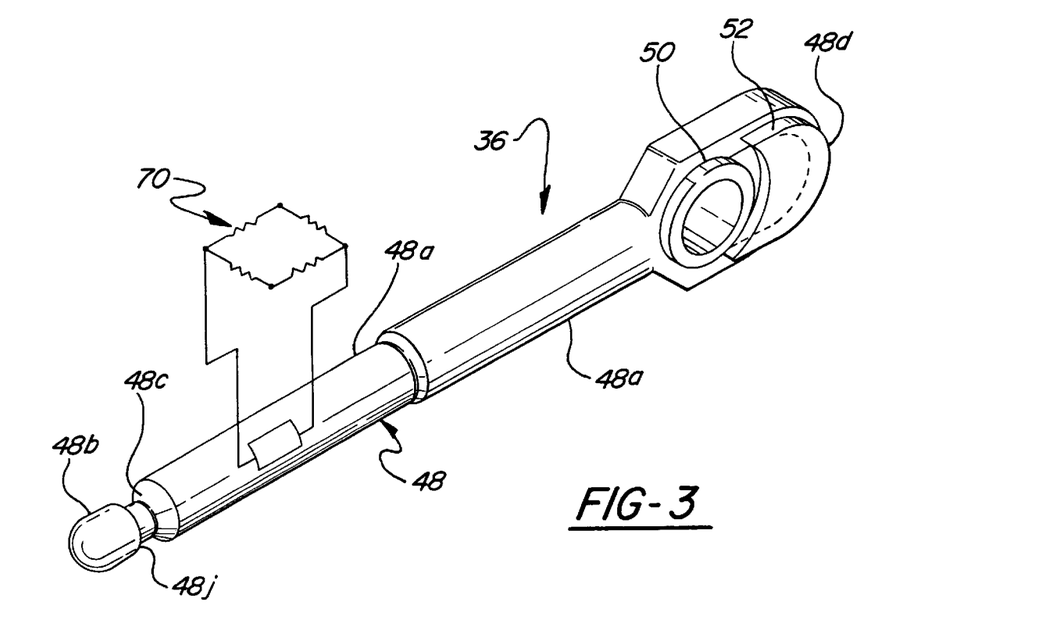
FIG. 3 is a fragmentary perspective view of the pushrod assembly.
Figures 4, 5:
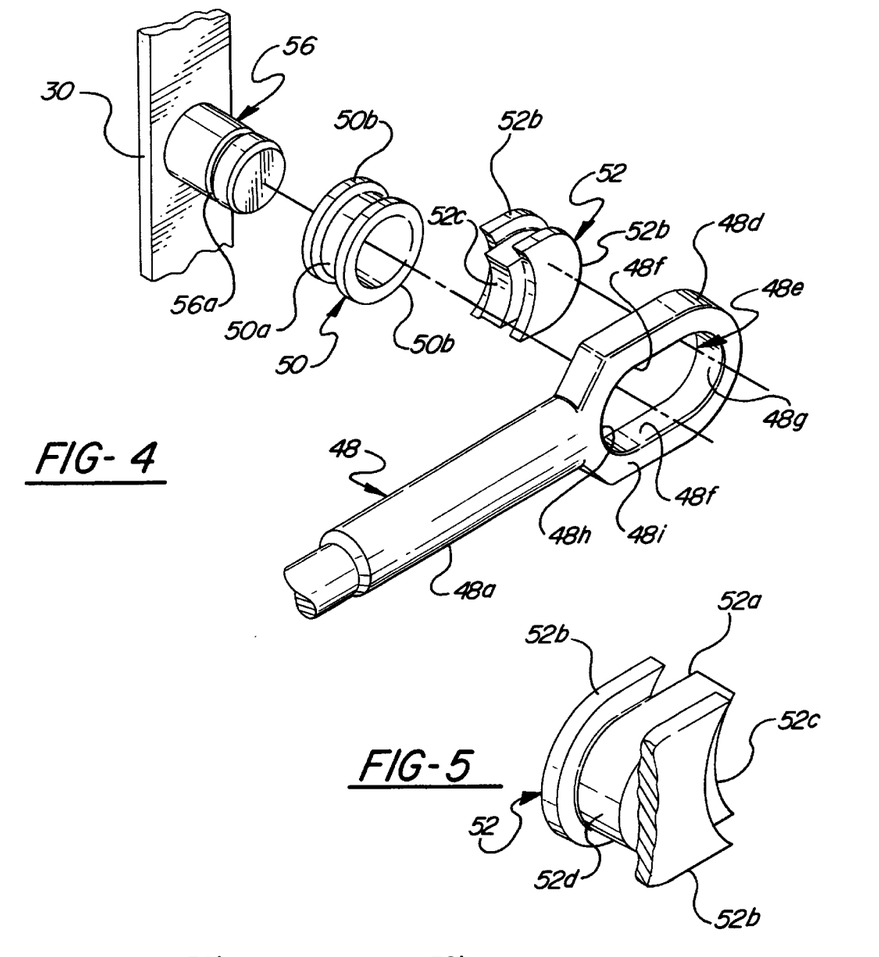
FIG. 4 is an exploded view of the pushrod assembly.
FIG. 5 is a fragmentary perspective view of an isolator member utilized in the pushrod assembly.

Pushrod 48 is formed of a suitable carbon steel and includes a main body generally circular portion 48a, a front end head portion 48b separated from main body portion 48a by an annular groove 48c, and a rear end generally flat eye portion 48d defining an oblong slot or opening 48e. Eye opening 48e is defined by parallel side surfaces 48f extending generally parallel to the central axis of the rod assembly and by confronting concave rear and front end surfaces 48g and 48h.

Figure 6:
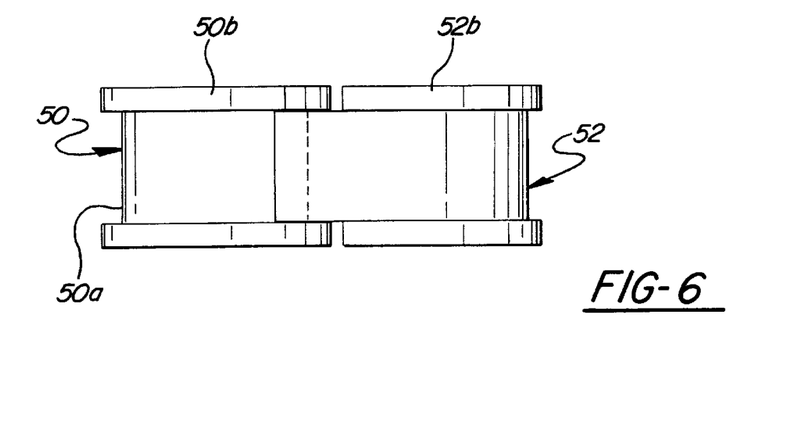
FIG. 6 is a top view of an isolator member and bushing utilized in the pushrod assembly.

Bushing 50 has a generally cylindrical configuration and includes a main body cylindrical portion 50a and circular flange portions 50b at each end of the cylindrical main body portion. Bushing 50 is sized and configured to fit slidably in eye opening 48e. Specifically, main body portion 50a has a diameter approximating the width of opening 48e so that the main body portion may fit slidably in the opening; main body portion 50a has a width approximating the width of opening 48e; and flanges 50b are sized and configured to be positioned against opposite side faces 48i of the eye portion of the pushrod to guide the bushing in the eye opening and preclude lateral displacement of the bushing relative to the eye portion. The radius of curvature of main body portion 50a matches the radius of curvature of front concave end surface 48h so that the bushing may fit snugly and matingly in the front end of opening 48e with the convex outer surface of main body 50a seating conformingly against concave surface 48h. Main body portion 50a has an inner diameter 50c sized to fit a pivot pin 56 suitably secured to a side face 30a of pedal arm 30. Bushing 50 may be formed of a suitable nonresilient plastic material.

Isolator member 52 is formed of a suitable resilient or elastomeric material such, for example, as 70 durometer urethane. Isolator member 52 includes a main body portion 52a and flange portions 52b. Main body portion 52a has a width corresponding generally to the width of opening 48e and has a height corresponding generally to the height of opening 48e so that the isolator member may fit slidably in the opening with the flange portions 52b positioned against opposite side faces 48i of the eye portion 48d of the pushrod to guide the isolator in the eye opening and preclude lateral displacement of the isolator member relative to the eye portion. Main body portion 52a defines a forward concave surface 52c and a rearward convex surface 52d.

Bushing 50 and isolator member 52 are positioned in tandem relation in opening 48e with the convex outer surface of main body portion 50a of bushing 50 positioned against front opening concave surface 48h, concave surface 52c of isolator member 52 positioned in abutting engagement with the outer convex surface of bushing main body portion 50a, and isolator member convex surface 52d seated against rear opening surface 48g. The bushing and isolator member have a combined effective length when abutted together substantially corresponding to the length of opening 48e so that the bushing and isolator member are snugly positioned within the opening but may undergo slight sliding movement in the opening as allowed by the resiliency of isolator member 52.

In assembled relation, the front end of the pushrod assembly is connected to the master cylinder piston 14 and the rear end of the pushrod assembly is connected to pivot pin 56 of the pedal arm assembly. Specifically, the head 48b of pushrod 48 is positioned in a socket 14a at the rear end of piston 14 and is held in coupled relation to the piston via a clip 60 positioned in socket 14a and including a series of circumferentially spaced prong fingers 60a engaging the annular shoulder 48j defined at the forward end of annular groove 48c to preclude displacement of the pushrod from the piston. The rear end of the pushrod assembly is secured to the pedal arm assembly by the positioning of pivot pin 56 in bushing 50 with the bushing and thereby the pushrod assembly precluded from lateral displacement with respect to pivot pin 56 by a suitable retainer clip engaged in an annular groove 56a in pin 56.

In the normal use of the system a vehicle operator's foot is utilized to move the control pedal arm in an apply or clockwise direction as seen in FIG. 1 to force pressurized fluid from master cylinder 10 into slave cylinder 16 to effect disengagement of the vehicle clutch by virtue of the slave cylinder output member 19 engaging clutch release lever 24 to move clutch release bearing 46 in a clutch disengage direction against the resistance of clutch diaphragm spring fingers 64, whereafter, following performance of the desired transmission shift, the clutch pedal may be allowed to move in a release or counterclockwise direction under the bias of diaphragm finger 64 and master cylinder return spring 38 to allow the clutch pedal arm to return to its rest or clutch engaged position. During the movement of the assembly in a clutch disengage direction there is a direct mechanical linkage between the pedal arm assembly and the master cylinder piston by virtue of the driving connection between the pivot pin 56, the hard bushing 50, and the pushrod 48 so that there is no lost motion or travel in the system during the clutch disengaging movement of the pedal arm assembly with the result that the point at which the clutch is disengaged and thereby the feel of the clutch may be readily and effectively fine tuned. Similarly, under normal clutch reengage operation with the operator's foot controllably resisting the return movement of the system against the bias of the diaphragm spring fingers 64, the master cylinder return spring 38, and the pedal assist spring 33, there is essentially a solid mechanical interconnection between the pivot pin 56 and the pushrod 48 since the loading is such that there is virtually no resilient compression of the isolator member 52. However, in a flyback situation where the operator's foot slips inadvertently off of the depressed clutch pedal and the push rod is thrust rapidly rearwardly under the bias of the diaphragm spring fingers, the master cylinder return spring, and the pedal assist spring, the isolator member, by virtue of its elastomeric characteristics and its unique positioning in the system, acts to isolate the pushrod from extreme impact loading such as would normally result as the piston 14 of the master cylinder bottoms out against the clip 66 in the rear end of the master cylinder defining the extreme rear end of the stroke of the piston. In systems without an isolator member, the described flyback scenario, where the operator's foot slips inadvertently off of the depressed clutch pedal, frequently results in pushrod failure. Specifically, either the retreating pushrod has broken out of the clip 60 as the piston bottoms out against the clip 66 by virtue of forceful disengagement of the spring fingers 60a from the shoulder 48j and/or the clip 66 has failed to hold the retreating piston as the piston reaches its bottoming position against the clip with the result that the pushrod assembly and the piston are disassociated from the master cylinder with resultant loss of fluid. In either failure mode, the control system is totally disabled.

Figure 7:
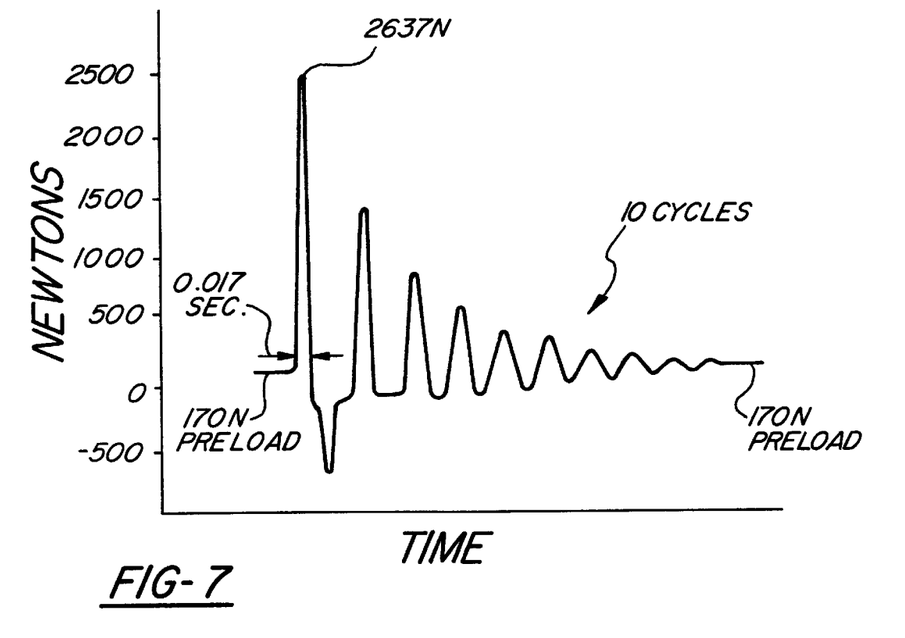
FIG. 7 is a graph illustrating the impact loading in a prior art pushrod assembly in a flyback situation.
Figure 8:
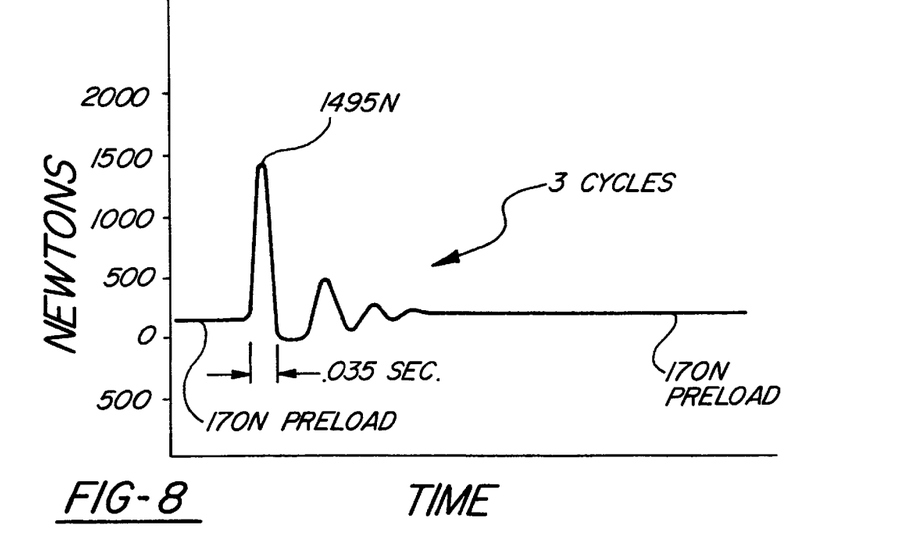
FIG. 8 is a graph illustrating the impact loading in a pushrod assembly according to the invention in a flyback situation.

The impact loading in the pushrod assembly upon the violent, flyback return of the assembly is shown in FIG. 7 for a prior art pushrod assembly without an impact isolator and in FIG. 8 for the pushrod assembly of the invention employing an impact isolator. In each case the impact loading is sensed by a wheatstone bridge 70 connected directly to the pushrod shaft itself so that the wheatstone bridge is sensing the tension impact loading in the pushrod as the piston 14 bottoms out against the clip 66 and the pedal assembly attempts to continue to move under its own momentum to impose an impact loading on the pushrod.

As seen in FIG. 7, showing a typical heavy duty truck system employing a prior art pushrod assembly, the initial cycle impact load on the system as the pushrod assembly returned uncontrollably was 2,637 Newtons which occurred in a period of 0.017 seconds whereafter 9 more oscillation cycles were measured giving a total of 10 oscillation cycles before the system damped back to the 170 Newtons preload condition.

By contrast, as seen in FIG. 8, showing the same heavy duty truck system employing the pushrod assembly of the invention, the initial impact loading was 1,495 Newtons and occurred over a period of 0.035 seconds and the system was totally damped back to the 170 Newton preload condition over a total of three oscillation cycles. Thus, the invention system employing the impact isolator reduced the peak loading of the system under flyback conditions from 2,637 Newtons to 1,495 Newtons, reduced the total number of cycles for the system to return to preload from 10 to 3, and increased the duration of the initial impact from 0.017 seconds to 0.035 seconds. The invention system thus, by essentially doubling the time over which the initial impact occurs, essentially halved the initial impact loading, and reduced the total number of oscillation cycles from 10 to 3. The invention isolator arrangement thus diminishes the peak loading on the pushrod assembly by a factor of approximately 50%. to significantly reduce the likelihood of failure of the system at the first impact and, further, the isolator member of the invention serves to significantly reduce the oscillation cycles occurring after the peak loading, for example from 10 cycles in the unisolated system to 3 cycles in the isolated system, thereby reducing the cumulative loading or fatigue generated in the system as a result of the impact to further minimize the likelihood of system failure.

Figure 9:
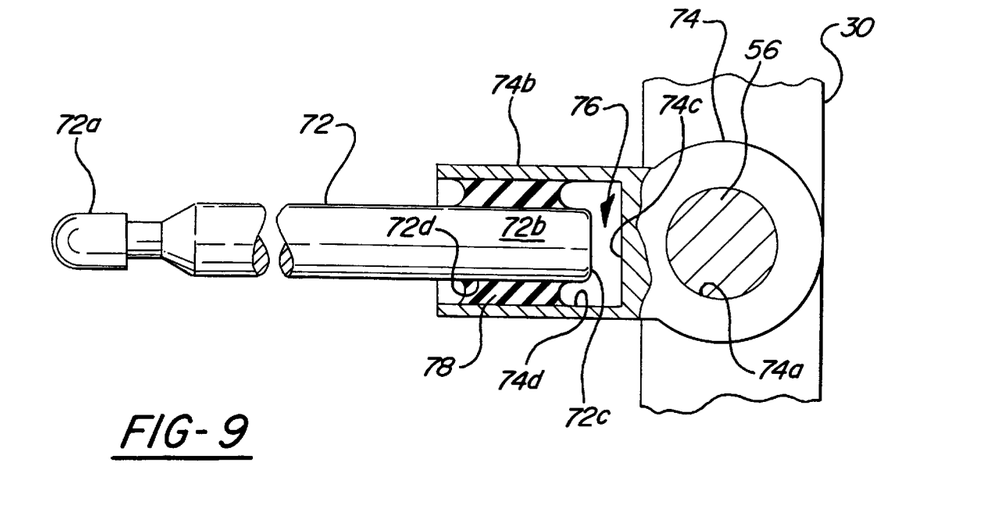
FIG. 9 is a fragmentary view of an alternate form of pushrod impact isolator structure according to the invention.

In the alternate form of the invention seen in FIG. 9, the pushrod assembly includes a main body rod section 72 connected at the front end thereof to the master cylinder piston in the manner previously described with reference to the FIGS. 1–8 embodiment. The pushrod assembly further includes an eye section 74 defining an eye opening 74a adapted to receive pivot pin 56 and a tubular portion 74b telescopically receiving the rearward portion 72b of rod section 72 with a clearance space 76 provided between the rearward end 72c of the rod section 72 and the bottom wall 74c of the cavity defined by the tubular eye section portion 74b. The isolator member in this case comprises an annular biscuit member 78 concentrically interposed between and fixedly secured to the inner circumference 74d of the tubular portion of the eye section and the outer circumference 72d of the rearward portion 72b of the rod section. Isolator member 78 may comprise any suitable elastomer and is suitably bonded to the circumferential surfaces of the rod section and the tubular portion of the eye section by any known bonding technique.

It will be seen that as the pushrod assembly abruptly retreats or flies back toward the clutch engage position in response to inadvertent slippage of the operator's foot off of the clutch pedal and the retreating master cylinder piston 14 bottoms out against the clip 66, the impact generated in the pushrod by the momentum of the retreating pedal arm assembly will be absorbed and mollified by distortion of the annular member 78 which will allow a limited amount of relative axial movement between rod section 72 and the eye section. When the clutch pedal is again applied to disengage the clutch, the biscuit member 78 allows a limited amount of lost motion between the pedal arm 30 and pushrod 72 with the extent of the lost motion defined and delimited by bottoming of pushrod rearward end 72c against the cavity bottom wall 74c. The FIG. 9 construction also functions to dampen vibrations or "buzzing" transmitted back through the system from the clutch diaphragm spring fingers to the clutch pedal.

Figure 10:
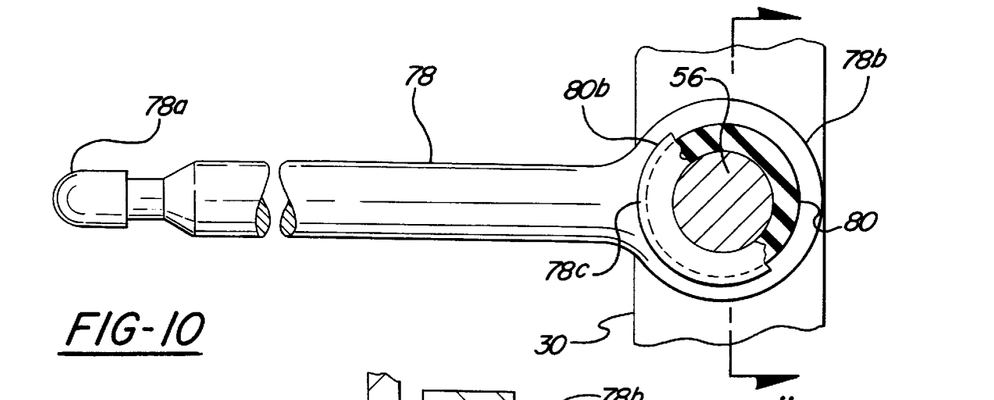
FIG. 10 is a fragmentary view of a further alternate form of a pushrod impact isolator structure according to the invention.
Figure 11:
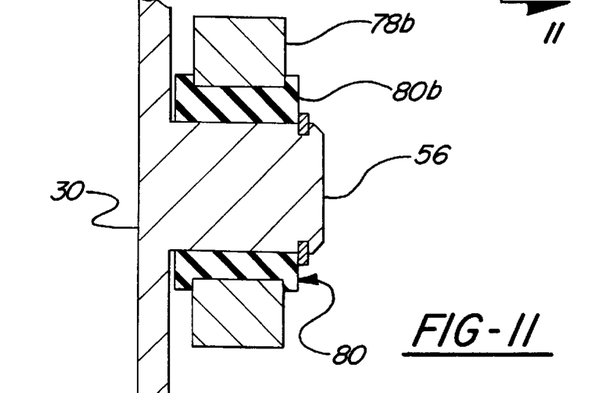
FIG. 11 is a cross-sectional view taken on line 11—11 of FIG. 10.

In the alternate form of the invention seen in FIG. 10, the assembly includes a pushrod 78 and a bushing 80. Pushrod 78 includes a forward end 78a for connection in the manner previously described to the piston of the master cylinder and an eye portion 78b at the rear end of the pushrod. Eye section 78b defines a circular opening 78c for receipt of a bushing 80 which has a mating circular configuration and which is centrally sized to receive pivot pin 56. Bushing 80, in addition to the central main body portion 80a received in eye portion opening 78c, includes laterally spaced outboard flange portions 80b positioned against opposite side faces of the eye portion of the pushrod to preclude lateral displacement of the bushing relative to the eye portion. Bushing 80 is made of a suitable elastomeric or resilient material. When the operator's foot inadvertently slips off of the clutch pedal, bushing 80 serves to allow a limited amount of movement of the control pedal relative to the pushrod upon bottoming out of the master cylinder piston against the clip 66 whereby to reduce the impact loading in the pushrod. As with the FIG. 9 embodiment, when the clutch pedal is again applied to disengage the clutch the bushing 80 allows a limited amount of lost motion between the pedal arm 30 and the pushrod 78 by virtue of the resiliency of the bushing material and this resiliency also functions to dampen vibrations or "buzzing" transmitted back through the system from the clutch diaphragm spring fingers to the clutch pedal.

The invention will be seen to provide a simple and efficient means of reducing the impact loading in the pushrod of a vehicular control system occurring as a result of inadvertent slippage of the operator's foot off of the associated control pedal.

Whereas preferred embodiments of the invention have been illustrated and described in detail it will be apparent that various changes may be made in a disclosed embodiment without departing from the scope or spirit of the invention.

What is claimed is:

1. In a vehicle control system including a slave cylinder having an output member adapted for control of a mechanism of the vehicle, a master cylinder, including a piston, operative to deliver pressurized fluid to the slave cylinder, and a pushrod assembly connected at a forward end thereof to the master cylinder piston, adapted to be connected at a rearward end thereof to a control pedal arm of the vehicle, and moveable in an apply and a release direction to effect control of the vehicle mechanism through the slave cylinder output member, the improvement wherein the pushrod assembly includes;

a pushrod connected at a forward end thereof to the master cylinder piston and adapted for connection at a rearward end thereof to the control pedal arm; and an isolator member of resilient material carried by the pushrod and interposed between the rearward pushrod end and the control pedal in a position to be resiliently distorted in response to movement of the control pedal in a release direction relative to the pushrod;

said pushrod including an eye portion proximate said rearward end thereof defining an eye opening adapted to receive a pivot pin carried by the control pedal arm; and said isolator member being positioned in the eye opening.

2. A vehicle control system according to claim 1 wherein:

the pushrod eye opening has an oblong configuration defining forward and rearward eye opening opposite ends;

the isolator member is positioned in the eye opening proximate said rearward eye opening end; and the pushrod assembly further includes a bushing of non-resilient material positioned in the eye opening proximate said forward eye opening end, adapted to receive the pivot pin of the pedal arm, and abutting the isolator member.

3. A vehicle control system according to claim 2 wherein the isolator member defines a concave surface abutting a matingly convex surface on the bushing.

4. A vehicle control system according to claim 3 wherein the forward and rearward eye opening opposite ends are defined by confronting concave surfaces;

a convex surface on the bushing is seated against the concave surface at said forward eye opening end; and the isolator member further includes a convex surface seated against the concave surface at the rearward eye opening end.

5. A vehicle control system according to claim 4 wherein;

the isolator member includes a main body portion positioned slidably in the eye opening and defining the concave and convex surfaces of the isolator member; and the isolator member further includes laterally spaced outboard flange portions positioned against opposite side faces of the eye portion of the pushrod to guide the isolator in the eye opening and preclude lateral displacement of the isolator member relative to the eye portion.

6. A vehicle control system according to claim 5 wherein the bushing includes a main body cylindrical portion positioned slidably in the eye opening and defining the convex bushing surfaces and laterally spaced outboard flange portions positioned against opposite side faces of the eye portion of the pushrod to guide the bushing in the eye opening and preclude lateral displacement of the bushing relative to the eye portion.

7. A vehicle control system according to claim 1 wherein the isolator member comprises a bushing of resilient material sized and configured to fit in the eye opening and adapted to receive the pedal arm pivot pin.

8. A vehicle control system according to claim wherein:

the eye opening has a circular configuration; and the isolator member bushing has a mating circular configuration.

9. A vehicle control system according to claim 1 wherein:

the pushrod includes a main body rod section connected at a forward end thereof to the master cylinder piston and an eye section defining an eye opening adapted to receive a pivot pin carried by the control pedal arm and a tubular portion telescopically receiving a rearward end of the rod section; and the isolator member comprises an annular member concentrically interposed between and fixedly secured to the inner circumference of the tubular portion of the eye section and the outer circumference of the rearward end of the rod section.

10. A vehicle control system including a slave cylinder having an output member adapted for control of a mechanism of the vehicle, a master cylinder, including a piston, operative to deliver pressurized fluid to the slave cylinder, and a pushrod assembly connected at a forward end thereof to the master cylinder piston, adapted to be connected at a rearward end thereof to a control pedal arm of the vehicle, and moveable in an apply and a release direction to effect control of the vehicle mechanism through the slave cylinder output member, characterized in that:

the pushrod assembly includes a pushrod connected at a forward end thereof to the master cylinder piston and adapted for connection at a rearward end thereof to the control pedal arm, and an isolator member of resilient material carried by the pushrod;

the pushrod includes an eye portion proximate said rearward end thereof defining an eye opening adapted to receive a pivot pin carried by the control pedal arm;

the pushrod eye opening has an oblong configuration defining front and rear eye opening opposite ends;

the isolator member is positioned in the eye opening proximate said rear eye opening end; and the pushrod assembly further includes a bushing of non-resilient material positioned in the eye opening proximate said front eye opening end, adapted to receive the pivot pin of the pedal arm, and abutting the isolator member.

11. A vehicle control system according to claim 10 wherein the isolator member defines a concave surface abutting a matingly convex surface on the bushing.

12. A vehicle control system according to claim 11 wherein:

the front and rear eye opening opposite ends are defined by confronting concave surfaces;

a convex surface on the bushing is seated against the concave surface on said front eye opening end; and the isolator member further includes a convex surface seated against the concave surface at the rear eye opening end.

13. A vehicle control system according to claim 12 wherein:

the isolator member includes a main body portion positioned slidably in the eye opening and defining the concave and convex surfaces of the isolator member; and the isolator member further includes laterally spaced outboard flange portions positioned against opposite side faces of the eye portion of the pushrod to guide the isolator in the eye opening and preclude lateral displacement of the isolator member relative to the eye portion.

14. A vehicle control system according to claim 13 wherein the bushing includes a main body cylindrical portion positioned slidably in the eye opening and defining the convex bushing surfaces and laterally spaced outboard flange portions positioned against opposite side faces of the eye portion of the push rod to guide the bushing in the eye opening and preclude lateral displacement of the bushing relative to the eye portion.

* * * * *